INVENTOR.
JAN P. NAUTA

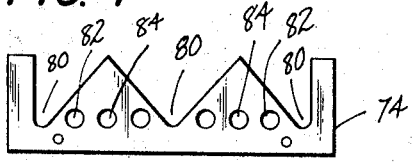
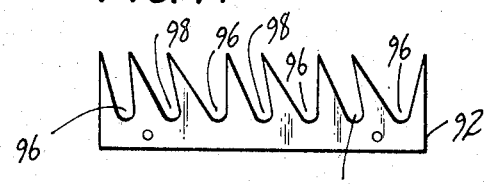
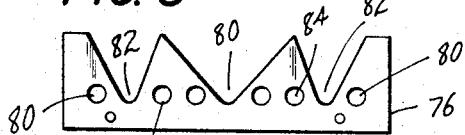
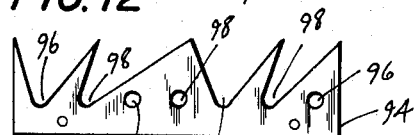
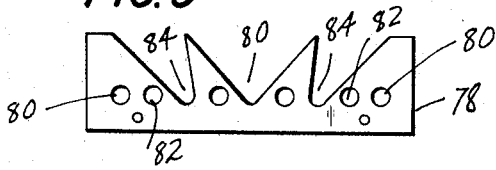
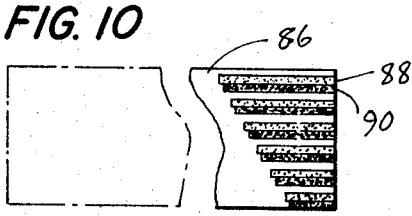
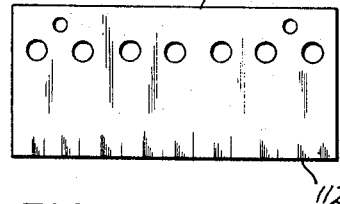
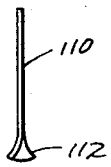
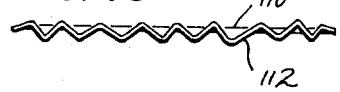
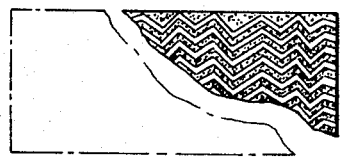

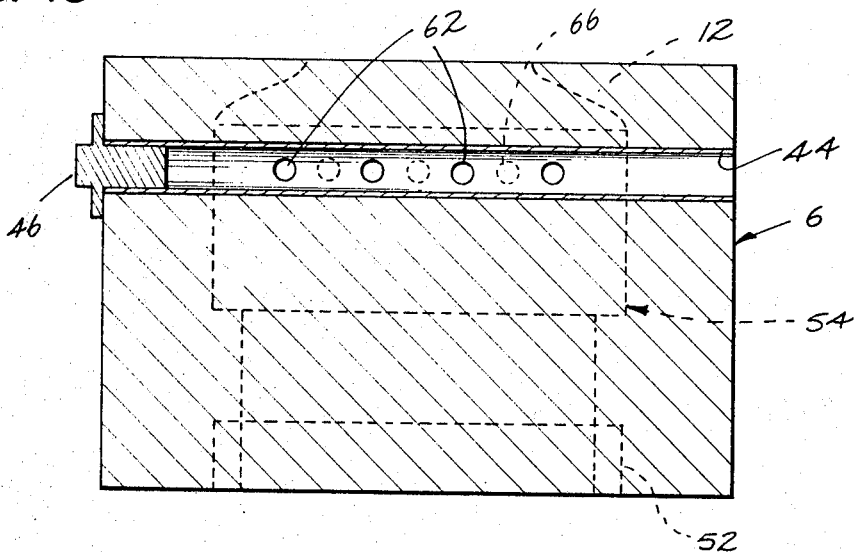
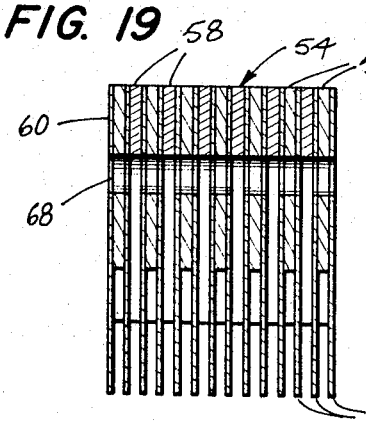
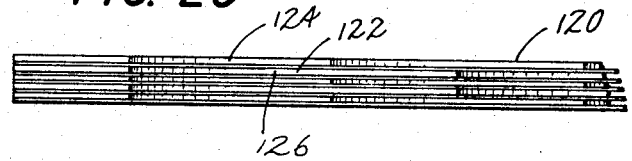
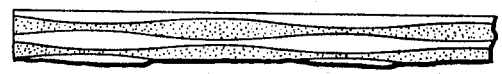
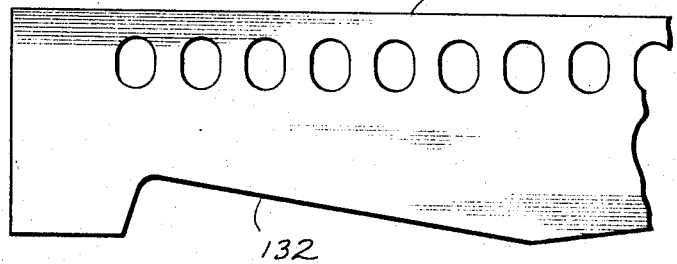
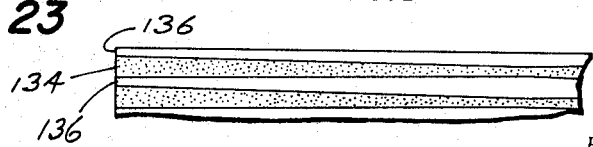

United States Patent Office 3,443,278
Patented May 13, 1969

3,443,278
APPARATUS FOR EXTRUDING MULTICOLORED SHEET MATERIAL
Jan P. Nauta, West Hartford, Conn., assignor to Rowland Products, Incorporated, Kensington, Conn., a corporation of Connecticut
Filed Oct. 22, 1965, Ser. No. 500,775
Int. Cl. B29f 3/12; B29d 7/02; D01d
U.S. Cl. 18—13                                14 Claims

ABSTRACT OF THE DISCLOSURE

An extrusion apparatus is provided for fabricating synthetic thermoplastic sheet material having differentially colored layers and utilizes an extrusion die member fed by a plurality of conduits for differentially colored fluid synthetic thermoplastic material. A color distributing stack of spacer and flow elements in the chamber has a plurality of manifolds extending therethrough and communicating with the conduits with the flow elements of the stack having apertures extending from the manifolds toward the extrusion orifice to provide superposed flow of differentially colored synthetic thermoplastic material.

---

The present invention relates to the extrusion of synthetic plastic sheet material, and more particularly, to novel apparatus for making extruded sheet material having layers of differentially colored material therein.

Oftentimes, the provision of extruded sheet material with differentially colored layers, or layers and bands, is desirable, particularly for novel decorative effects. Generally, such bands or layers of color extend parallel to the direction of extrusion, and a highly effective apparatus and method for making one form of differentially colored material are described in United States Patent No. 2,985,556, granted May 23, 1961, to William P. Rowland.

The term "differentially colored material" is intended to encompass materials which are visually distinguishable from each other or a first color to provide a visual pattern effect and includes materials containing coloring matter such as dyes and pigments and materials which are substantially transparent to provide distinct coloration and the use of streams of the same color which have distinct optical properties such as by incorporation of optically modifying components such as aluminum flakes which produce variation in light refraction or transmission with resultant visual pattern effect.

It is an object of the present invention to provide apparatus for making a novel and attractive synthetic plastic sheet material having generally longitudinally extending layers of differentially colored material which may provide a wide variation in patterns.

It is also an object to provide a relatively simple and highly efficacious method for extruding synthetic plastic sheet.

Another object is to provide novel extrusion apparatus for conveniently and economically producing layers of differentially colored material in the body of the synthetic plastic sheet material which is adapted to wide variation in pattern design and relatively rugged and economical in construction.

Still another object is to provide apparatus for making multilayered sheet material wherein the thickness of the layers may be varied across the width of the sheet material.

A specific object is to provide apparatus for making such synthetic plastic sheet material having differentially colored layers which is particularly adapted for convenient fabrication of eyeglass frames.

Other objects and advantages will be apparent from the following detailed description and claims and the attached drawings wherein:

FIGURES 7–9 are plan views of flow elements in another color distributing stack of the present invention;

FIGURE 10 is a fragmentary end view of synthetic plastic sheet material extruded with a color distributing stack utilizing the flow elements of FIGURES 7–9;

FIGURES 11 and 12 are plan views of flow elements in another color distributing stack of the present invention;

FIGURE 13 is a fragmentary end view of synthetic plastic sheet material extruded with a color distributing stack employing the flow elements of FIGURES 11 and 12;

FIGURE 14 is a plan view of an alternative embodiment of spacer element;

FIGURE 15 is a side elevational view thereof;

FIGURE 16 is a front elevational view thereof;

FIGURE 17 is a fragmentary end view of synthetic plastic sheet material extruded with a color distributing stack employing spacer elements of the type illustrated in FIGURES 14–16;

FIGURE 18 is a sectional view along the line 18—18 of FIGURE 3;

FIGURE 19 is a side elevational view in section of the color distributing stack of FIGURE 3 to a greatly enlarged scale;

FIGURE 20 is a fragmentary front elevational view of another embodiment of color distributing stack of the present invention;

FIGURE 21 is a fragmentary end view of synthetic plastic sheet material extruded with the color distributing stack of FIGURE 20;

FIGURE 22 is a plan view of another embodiment of spacing element for a color distributing stack; and FIGURE 23 is a fragmentary end view of synthetic plastic sheet material extruded with a color distributing stack employing the spacing element of FIGURE 22.

Figure 1:
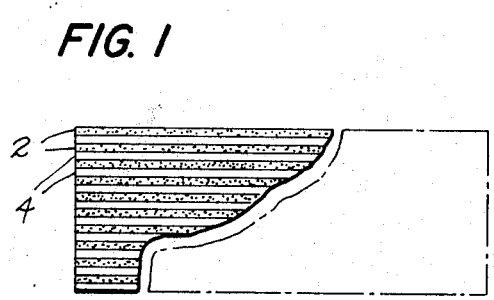
FIGURE 1 is a fragmentary end view of one embodiment of synthetic plastic sheet material extruded in accordance with the present invention.

It has been found that the foregoing and related objects may be readily attained by an extrusion assembly comprising an extrusion die member having a chamber therein and an extrusion orifice in one surface thereof which communicates with the chamber, a first conduit for supplying a first stream of fluid synthetic thermoplastic material to the chamber at a first point spaced from the extrusion orifice and a second conduit for supplying a second stream of differentially colored fluid synthetic thermoplastic material to the chamber at a second point spaced from the first point and from the extrusion orifice with the conduits extending from surfaces other than that having the extrusion orifice.

A color distributing stack comprised of a multiplicity of spacer and flow elements is disposed within the chamber of the extrusion die member and has a plurality of manifolds extending therethrough adjacent the end thereof spaced from the extrusion orifice. Various of the manifolds communicate with one of the conduits and others communicate with the other conduit so as to provide flow of material from both of said conduits through the manifolds. The flow elements have at least one aperture or flow path therein extending from one of the manifolds to the other end of the stack adjacent the extrusion orifice to provide for flow therethrough, and at least two flow elements have overlying apertures extending from manifolds communicating with differing conduits so as to provide superposed flow of thermoplastic material from both of the conduits in at least a portion of the stack. A spacer element separates the two flow elements from the manifolds for at least a portion of the distance to the end of the stack adjacent the extrusion orifice after which the superposed flowing materials from the two conduits may combine to produce a synthetic plastic sheet material having differentially colored layers in at least a portion of the width thereof.

Although various arrangements may be employed such as providing all conduits above or below the stack, one convenient arrangement locates one conduit above and another conduit below the color distributing stack and both extend across the width thereof. The manifolds extend upwardly from the lower conduit and downwardly from the upper conduit in spaced relationship transversely of the color distributing stack, preferably in alignment to minimize variations in flow and pressure differentials. Such an arrangement normally will utilize a cross-head extruder arrangement wherein the main extruder feeds to the rear of the extrusion die and the conduit from the extruder expands inwardly to the color distributing stack and extends across the width thereof to enable the several manifolds to be fed therefrom. The cross-head extruder directly feeds to a conduit extending across the width of the color distributing stack and enables the several cooperating manifolds to be fed therefrom.

Generally, a multiplicty of manifolds will extend through the color distributing stack. Although as few as three manifolds may be employed with limitations on versatility, generally at least seven and preferably twelve or more are employed to obtain highly effective flow of the synthetic plastic material. Depending upon the extruders, the thickness of the flow elements, and the width and thickness of the sheet material, even more manifolds may be desirable for some installations. Generally, although adjacent manifolds may carry the thermoplastic material from different conduits, a series of adjacent manifolds may be fed by the same conduit for a monocolored portion of the width of the sheet material or for special effects where the distribution of the other color to that portion may be impeded for the desired pattern.

The flow elements and spacer elements are generally plate-like members assembled in a stack so as to provide spacer elements between one or more flow elements defining a layer. Although the spacer elements are generally unapertured, the flow elements are apertured as by notches or slots to provide paths therein from the manifolds to the edge adjacent the extrusion die orifice. To provide for a substantially uniform layer or width of a color encompassing two manifolds of that color separated by a manifold of another color, the slots or notches defining the apertures from the manifolds expand the width toward the edge adjacent the extrusion die orifice and desirably converge with adjacent slots or notches to minimize spacing therebetween.

It will be appreciated that more than two differentially colored synthetic plastic materials may be employed in accordance with the present invention by providing additional conduits and manifolds connected to the various conduits. In such a method and apparatus, various apertures in the flow elements communicate with the manifolds for the several colors and are so configured as to provide overlying flow of streams of differentially colored thermoplastic material from the various conduits in any desired arrangement. In accordance with one aspect of the invention, the flow from each of the conduits may be provided to the depth of the combined stream at a portion of the width thereof or various combinations of the several colors may be so combined to provide the full depth at any one point. In addition, layers containing more than one color may be formed by having the apertures in the flow elements configured to provide side-by-side flow of streams of molten thermoplastic material from more than one conduit. In this manner, various patterns of the differentially colored material through the depth and width of the sheet may be obtained.

It will be appreciated that the number of layers of differentially colored material may be varied widely. Although as few as three layers will provide the differentially colored layered effect of the present invention, generally it is desirable to provide four to ten layers. As many as twenty, and even more, layers may be provided depending upon the thickness of the material being extruded but factors of fluid dynamics in thin stream layers must be considered in determining the number of layers that may be employed for a given thickness of material.

Because of the effect of fluid dynamics and static flow across the surfaces of the spaces and flow elements, it is generally desirable to have a minimum thickness of about 0.03 inch for the stream of color between the spacer elements. However, as the thickness of the stream is increased over the range of the next 0.10 inch, the flow increases exceedingly rapidly so that it is often desirable to make a thick layer between thinner layers as a composite of several stream layers of that color separated by spacer elements to avoid excessive fluid pressure which would distort the differentially colored layers thereabove and therebelow. For example, a flow element of 0.047 inch thickness between spacer elements may produce a stream layer of 0.010 inch while a flow element of 0.063 inch thickness between spacer elements produces a stream of 0.038 inch. Thus, to produce a stream of 0.020 inch with greater control, it is desirable to employ two of the smaller flow elements separated by a spacer element, desirably of about 0.015 inch. Similarly, even thicker streams of a single color may be compiled by use of small thickness flow elements to obtain greater control of the thick streams.

The flow elements should have the flow apertures therein configured so as to supply sufficient molten material to avoid erratic edges between layers or adjacent bands of color depending upon the color formation desired. Where the sides of adjacent apertures in the flow elements converge toward the extrusion die orifice, the flow elements should provide a flow path of sufficient length to permit flow of sufficient material to such points of convergence for effecting uniformity of the thickness of the layer to such points and/or the flow elements should have a sufficiently high number of manifolds extending therethrough from the conduits so that a greater number of flow apertures of smaller width can be employed to effect the desired sufficiency of flow.

Although the spacer elements desirably extend to the end of the stack adjacent the extrusion die orifice, it may be desirable to have the spacers or portions thereof, of greater or lesser length than the flow elements so that they extend beyond or terminate short of the end of the flow elements in at least portions thereof. By using shorter spacer elements, disturbance in the regularity of the adjacent stream layers may be effected by use of a stream of higher flow rate and various flow patterns in the differentially colored material or special effects can be superposed thereon. For example, by providing a pair of adjacent flow elements for a single color separated by a spacer element configured so that its edge adjacent the extrusion die orifice is recessed inwardly of the color distributing stack at one point and tapers outwardly therefrom over a portion of the width of the spacer element, it is possible to obtain sheet material having a layer of tapering thickness over a portion thereof. The stream of the color formed by the separated flow plates will be of greater width adjacent the deeply recessed portion of the recessed edge due to reduced resistance to flow along the surfaces of the spacer element and will taper to a reduced thickness as the recessed edge tapers outwardly. Similar effects can be obtained by recessed edge spacers above and below a flow element of slightly greater thickness than the flow elements of the encapsulating streams due to the reduced static pressures of the encapsulated stream, with the encapsulating streams of another color disposed thereabove and therebelow being of reduced dimension.

In another structure, the manifolds supplying the colors may be widely spaced across the width of the color distributing stack and the flow apertures thus caused to diverge considerably. When the thickness of the flow elements is sufficiently small in such a structure, the undulations in the width of the layers of colors will be apparent due to the effect of fluid dynamics since the velocity and flow volume of the differentially colored materials will be varying across the width of the sheet material. By crimping or otherwise deforming the edge of the spacer elements adjacent the extrusion die orifice, undulations in the differentially colored materials may also be provided through disturbance of the flow thereof.

Referring now in detail to FIGURE 1 of the attached drawings, there is fragmentarily illustrated in end view synthetic plastic sheet material extruded in accordance with the present invention comprised of a plurality of layers 2 of a first color and layers 4 alternating therewith of a differentially colored material.

Figure 2:
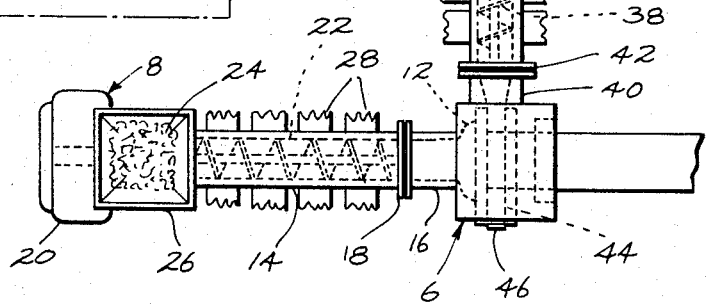
FIGURE 2 is a fragmentary plan view of an extruder assembly embodying the present invention.

Referring next to FIGURES 2, 3, 18 and 19, therein illustrated is apparatus for extruding the sheet material of FIGURE 1. Referring in particular to FIGURE 2, an extruder assembly embodying the present invention is generally comprised of an extrusion die block assembly generally designated by the numeral 6, a first extruder and conduit assembly generally designated by the numeral 8 and a second extruder and conduit assembly generally designated by the numeral 10. The mainstream of plastic material to supply one of the layers 2, 4 is fed into the extrusion die assembly through the mainstream duct portion 12 of the extruder and conduit assembly 8. Before entering the duct portion 12, the plastic material passes through the heating section 14 of the conduit which is coupled to the intake section 16 by the collar assembly 18. To supply and melt the plastic material a conventional extruder is provided wherein a motor 20 drives the feed screw 22 to draw synthetic plastic pellets 24 stored in the hopper 26 through the heating section 14 of the conduit wherein a series of heating elements 28 melts the pellets 24 into a fluid stream of synthetic thermoplastic material.

A stream of fluid synthetic thermoplastic material for the other of the layers 2, 4 is supplied to the extrusion die assembly 6 by the second extruder and conduit assembly 10 wherein the conduit similarly includes a heating section 30 wherein the heating elements 32 melt the pellets 34 in the hopper 36 to provide a fluid stream of synthetic thermoplastic material as they are moved along by the screw 38. The intake section 40 is coupled to the heating section 30 through the collar assembly 42 and has a tubular portion 44 extending across the die assembly 6 which is locked within the die assembly by the flanged cap 46.

Figure 3:
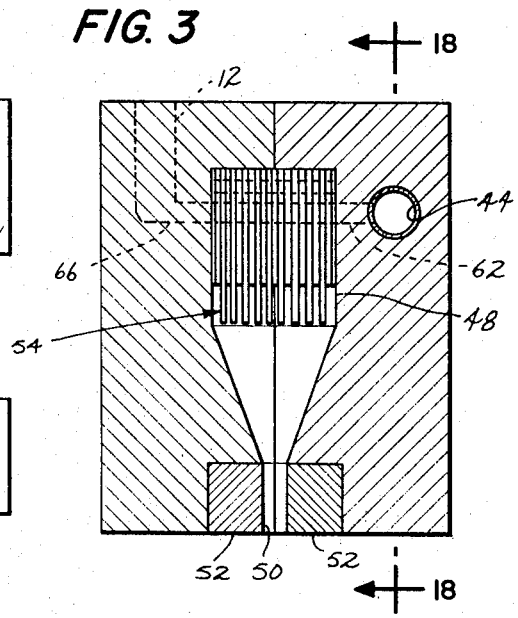
FIGURE 3 is a side sectional view to an enlarged scale of the extruder die assembly of FIGURE 2.

Referring next to FIGURES 3 and 18, it can be seen that the die block assembly 6 has an elongated chamber 48 therein with a generally rectangular portion tapering to a reduced thickness adjacent an elongated extrusion orifice 50 defined by the die lips 52 in the front face of the extrusion block assembly 6. The tubular portion 44 is disposed above the chamber 48 and the mainstream duct portion 12 fans out to an increased width and extends below the chamber 48.

Figure 4:
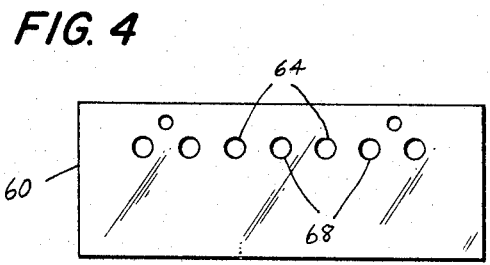
FIGURE 4 is a plan view of a spacing element in the color distributing stack of the extruder die assembly in FIGURE 3.
Figure 5:
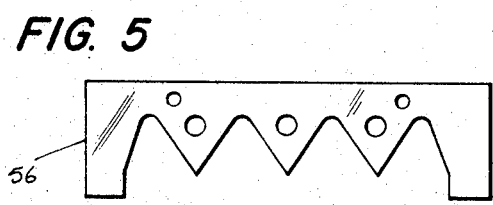
FIGURE 5 is a plan view of a flow element in the color distributing stack thereof.
Figure 6:
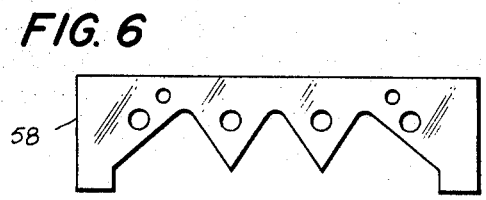
FIGURE 6 is a plan view of another flow element in the color distributing stack thereof.

Seated and locked within the chamber 48 is a color distributing stack generally designated by the numeral 54 which is comprised of alternately disposed plate-like flow elements 56, 58 separated by plate-like spacer elements 60. Extending downwardly from the tubular portion 44 of the extruder and conduit assembly 10 are a plurality of conduit portions 62 which communicate with manifolds or flow paths through the color distributing stack 54 defined by aligned apertures 64 in the flow elements 56, 58 and spacer elements 60. Extending upwardly from the mainstream duct portion 12 are a plurality of conduit portions 66 which communicate with manifolds defined by the apertures 68 in the flow elements 56, 58 and spacer elements 60 and best seen in FIGURES 4–6. As can be seen, the manifolds defined by apertures 64, 68 alternate so as to provide adjacent flow paths for material from the two conduit assemblies 8, 10.

The apertures 64 in the flow elements 56 are notched outwardly so that the apertures expand and the adjacent sides thereof converge toward the extrusion die orifice 50 to provide expanding paths for the synthetic plastic material flowing therethrough from the manifolds communicating with the tubular portion 44 of the conduit assembly 10. The apertures 68 in the flow elements 58 are similarly notched outwardly to provide expanding paths for synthetic plastic material flowing therethrough from the manifolds communicating with the mainstream duct portion 12. It can be seen that the expanding apertures in the flow elements 56, 58 alternate across the width of the color distributing stack. The flow elements 56, 58 and spacer elements 60 are pinned together in a stack against relative displacement by elongated fasteners 70 seated in the apertures 72 of the members 56, 58 and 60.

Thus, in operation of this particular embodiment, molten material of a first color from the extruder and conduit assembly 10 enters into the extrusion die assembly 6 through the tubular portion 44, and passes downwardly through the conduit portions 62 into the manifolds 64 of the color distributing stack 54. As it flows through the flow elements 56, it is allowed to flow outwardly through the notched-out apertures between the spacer elements 60. Similarly, differentially colored molten thermoplastic material from the extruder and conduit assembly 8 flows into the mainstream duct portion 12 and upwardly through the conduit portions 66 into the manifolds 68 in the color distributing stack 54. As it flows through the flow elements 58, it is permitted to flow outwardly in the notched-out portions between the spacer elements 60. As the streams of material flowing within the notched-out apertures of the flow elements 56, 58 pass outwardly of the spacer elements 60, they combine into a multilayered stream with alternating layers of differentially colored material. This stream is then directed by the configuration of the extrusion chamber 48 to the extrusion orifice 50 defined by the die lips 52 wherein its final configuration is established in terms of width and thickness, to produce sheet material substantially as illustrated in FIGURE 1.

Referring now to FIGURES 7–10, flow elements of the type illustrated in FIGURES 7–9 are used to produce the sheet material of FIGURE 10 wherein two layers containing differentially colored bands alternate with a third differentially colored material and also taper in width through the depth or thickness of the sheet material. The flow elements specifically illustrated in FIGURES 7–9 represent those utilized in fabricating the upper portion of the sheet material of FIGURE 10. As can be seen, each of the flow elements 74, 76 and 78 has a multiplicity of apertures 80, 82 and 84 across the width thereof which provide manifolds connecting to three conduits each carrying a differentially colored material. The flow element 74 has the apertures 80 therein communicating with conduits of the same color so that the layer formed thereby is of a single color as represented by the numeral 86 in FIGURE 10.

The flow element 80 of FIGURE 8 has the apertures 82 at either side thereof communicating with a conduit of a second color and the central aperture 80 therein communicating with the conduit for the same color as that utilized by the flow element 74. In this manner, two bands of a second color represented by the numeral 88 in FIGURE 10 are provided in the layer formed thereby with the first color disposed therebetween. The flow element 78 has the apertures 84 at either side thereof communicating with a conduit for a third color and the central aperture 80 communicating with the conduit for the first color utilized by the flow element 74. Thus, this flow element provides two bands of a third color indicated by the numeral 90 in FIGURE 10 to either side of a central portion of the first color.

In assembling the remaining portion of the color distributing stack, the flow element 74 and FIGURE 7 is again repeated and the flow elements 76, 78 of FIGURES 8 and 9 have the shape of the notched-out apertures 82, 84, respectively, modified to an increasing extent to reduce the width thereof and the width of the apertures 80 expanded to compensate for this reduction. Thus, the bands of the second and third colors are reduced in width through the depth of the sheet material as illustrated.

Referring now to FIGURES 11–13, the flow elements 92, 94 of FIGURES 11 and 12 are used to fabricate the sheet material of FIGURE 13. As can be seen, the flow element 92 has a series of notched-out apertures 96, 98, which alternate across the flow element and provide manifolds communicating with two conduits for differentially colored material. The flow element 94 has apertures 96, 98 therein which also alternate across the width of the flow element but which are not all notched out so that flow is not obtained from all conduits. Both flow elements are asymetric in terms of the notched-out apertures 96, 98 and of the width of the apertures adjacent the extrusion die orifice so that reversal of the flow elements 92, 94 will produce a different orientation of colored material issuing from the manifolds therein.

In forming the sheet material of FIGURE 13, the layer 100 is provided by the flow element 94 as illustrated and the layer 102 is provided by the flow element 92 as illustrated. The layer 104 is provided by the flow element 94 in reversed position, the layer 106 is provided by the flow element 94 as illustrated and the layer 108 is provided by the flow element 92 in reversed position. Thus, layers have the color bands A, B varying in location across the width of the sheet material.

Referring now to FIGURES 14–17, the spacer element 110 has the edge portion 112 thereof to be disposed adjacent the extrusion die orifice corrugated as best seen in FIGURES 15 and 16 so as to provide undulations therein. These undulations produce disturbance in the flow of material from the flow elements thereabove and therebelow so as to produce a non-rectilinear layered structure of the type illustrated in FIGURE 17.

Referring now to FIGURES 20 and 21, the flow elements 120, 122 thereof have the notched-out apertures 124, 126 therein opening to a relatively large width with respect to the thickness of the stock from which the elements are formed, and have spacer elements 128 therebetween. By controlling the pressure of the thermoplastic material in the conduits, the flow from adjacent apertures 124, 126, than in the area in alignment with the manifold diameter. Accordingly, the aligned manifold portion of an aperture in one flow element will align with the widely divergent portion of an aperture in the adjacent flow element and the pressure of the material thereat will distort the uniformity of the thickness of that stream due to the lesser pressure in the stream thereabove or therebelow and produce undulations in the width of the layers as illustrated in FIGURE 21.

Referring now to FIGURES 22 and 23, the spacer element 130 has its edge adjacent the extrusion die orifice provided with a recess 132 which is of maximum depth adjacent one side and tapers outwardly toward the extrusion die orifice. Such a spacer element when placed between flow elements apertured so as to provide the same color will create reduced resistance to flow of that color through those flow elements at the recessed portion and increase the amount and pressure of material issuing thereat. This increased flow will depend upon the depth of the recess at that point and the increased pressure of this colored stream will produce deflection in the streams of the differentially colored material disposed thereabove and therebelow to produce a sheet material as indicated in FIGURE 23. As can be seen, the layer 134 of the first color provided by a pair of flow elements separated by the recessed spacer element 130 tapers to a reduced thickness toward the center of the sheet material and the layers 136 of the differentially colored material taper to a reduced thickness toward the side edge of the sheet material.

As can be seen from the foregoing specific illustrations and embodiments, a high degree of versatility is provided to the designer in terms of the patterns which can be extruded in accordance with the present invention. Multiple layers of the same color can be provided in one portion of the width of the sheet material while adjacent portions include alternating colors. In addition to truly colored or pigmented materials pearlescent and metallic components may be provided in a stream of the same color as that employed in an adjacent layer to provide unusual effects.

As shown in FIGURES 7–10, a band of color may be tapered in width through the depth of the sheet material to provide decreasing intensity of that color through the tapering portion. This type of material simulates the gradient density sheet material described and claimed in United States Patent No. 2,985,556, granted May 23, 1961, to William P. Rowland.

It will also be appreciated that motion may be superimposed upon the layered streams to further vary the disposition of the differentially colored portions and to upset or otherwise modify the positioning of the pearlescent and metallic flake material within the body of the sheet material.

The spacer and flow elements may be fabricated so as to be relatively interchangeable in the color distributing stack to make various types of patterns, particularly when the notched-out apertures in the flow elements are asymetric with respect to the width thereof. For making thicker layers, several flow elements having the same configuration of apertures may be superimposed with relatively thin spacer elements therebetween to minimize undue interference with the flow of synthetic plastic material thereabove and therebelow. By varying the configuration of the notched-out apertures in the flow elements, the width and disposition of the colored streams may be widely varied so long as provision is made for adequate flow of synthetic thermoplastic material to fill the aperture at its widest portion and minimize trailing at the edges between two differentially colored materials.

Thus, it can be seen that the present invention provides for the manufacture of a novel and attractive synthetic plastic sheet material having generally longitudinally extending layers of differentially colored material which may provide a wide variation in patterns. The present invention provides a relatively simple and highly efficacious apparatus for producing such sheet material having longitudinally extending layers of differentially colored material.

By use of relatively economically and simply fabricated components, the designer may create numerous pattern designs containing both multicolored layers and multicolored bands across the width of the sheet material. Such sheet material has a wide variety of applications and is particularly adapted to the fabrication of eyeglass frames wherein beveling of the edge portions thereof will expose the multicolored layers.

Having thus described the invention, I claim:

1. An extrusion assembly for fabricating synthetic thermoplastic sheet material having differentially colored layers therein comprising: an extrusion die member having a chamber therein and an extrusion orifice in one surface thereof communicating with said chamber, said extrusion orifice being of substantially greater width than depth to provide a sheet material; a first conduit for supplying a first stream of fluid synthetic thermoplastic material at one point in said chamber spaced from said extrusion orifice; a second conduit for supplying a second stream of differentially colored fluid synthetic thermoplastic material at a second point spaced from said first point and said extrusion orifice; and a color distributing stack of spacer and flow elements in said chamber having a plurality of manifolds extending therethrough adjacent the end thereof spaced from said extrusion orifice and normal to the elongated dimension of said extrusion die and to the flow path of plastic material therethrough, each manifold communicating with one of said first and second conduits, said spacer and flow elements being of substantially greater dimension parallel to the elongated dimension of said extrusion orifice than in the dimension normally thereto to provide relatively thin layers of the synthetic plastic material flowing therebetween, each of said flow elements having at least one aperture therein extending from one of said manifolds and expanding in width to the other end of said flow element adjacent said extrusion orifice to provide for flow therethrough of a stream of thermoplastic material from the conduits, at least two of said flow elements having overlying apertures extending from manifolds communicating with different conduits so as to provide superposed flow of thermoplastic material from both of said conduits at least in a portion of said stack, a spacer element separating said two flow elements from said manifolds for at least a portion of the distance to the end of said stack adjacent said extrusion orifice after which the superimposed flowing materials may combine to produce a synthetic plastic sheet material having differentially colored layers.

2. The extrusion assembly of claim 1 wherein said apertures in said flow elements are generally V-shaped to provide expanding flow paths for the thermoplastic material from the conduits as it flows toward said extrusion die orifice.

3. The extrusion assembly of claim 1 wherein said spacer elements are relatively thin with respect to the thickness of said flow elements.

4. The extrusion assembly of claim 1 wherein said extrusion assembly includes a third conduit for supplying a third stream of fluid synthetic thermoplastic material at a third point in said chamber spaced from said extrusion orifice and from said first and second points and wherein said color distributing stack has a manifold communicating with said third conduit and wherein one of said flow elements has an aperture extending from a manifold communicating with said third conduit and an adjacent flow element has an aperture extending from a manifold communicating with one of said first and second conduits to provide superposed flow of thermoplastic material from said third conduit and said one of said first and second conduits in at least a portion of said stack with a spacer element separating said two flow elements for at least a portion of the distance to the end of the stack adjacent the extrusion die orifice after which the superposed flowing materials from the several conduits may combine to produce a synthetic plastic sheet material having layers with three differentiated colors.

5. The extrusion assembly of claim 1 wherein at least one of said flow elements has apertures extending from manifolds communicating with different conduits so as to provide adjacent flow of thermoplastic matreial from both of said conduits at least in a portion of said stack to provide differentially colored bands within the same layer of synthetic plastic sheet material produced therefrom.

6. The extrusion assembly of claim 1 wherein said color distributing stack has a multiplicity of flow elements and spacer elements with flow element apertures communicating with one of said conduits tapering in width adjacent said extrusion die orifice through the depth of the color distributing stack so as to provide a band of material from said first conduit which tapers in thickness through the depth of the sheet material produced therefrom.

7. The extrusion assembly of claim 1 wherein said color distributing stack has a plurality of adjacent flow elements with apertures therein communicating with the same manifold and relatively thin spacer elements disposed between each of said plurality of flow elements so as to provide a layer of the material from the conduit with which said manifold communicates which is a composite of the streams issuing from said plurality of flow elements.

8. The extrusion assembly of claim 1 wherein spacer elements in said color distributing stack have non-rectilinear edges adjacent said extrusion die orifice.

9. The extrusion assembly of claim 1 wherein a spacer element in said color distributing stack has a recess terminating relatively closely to one of said manifolds and tapering outwardly toward said extrusion die orifice.

10. An extrusion assembly for fabricating synthetic thermoplastic sheet material having differentially colored layers therein comprising: an extrusion die member having a chamber therein and an extrusion orifice in one surface thereof communicating with said chamber, said extrusion orifice being of substantially greater width than depth to provide a sheet material; a first conduit for supplying a first stream of fluid synthetic thermoplastic material and having a plurality of spaced portions extending into said chamber adjacent the end thereof spaced from said extrusion orifice; a second conduit for supplying a second stream of differentially colored fluid synthetic thermoplastic material and having a plurality of spaced portions extending into said chamber adjacent said end thereof spaced from said extrusion orifice, said first and second conduit portions being spaced apart; and a color distributing stack of spacer and flow elements in said chamber having a plurality of manifolds extending therethrough adjacent the end thereof spaced from said extrusion orifice and normal to the elongated dimension of said extrusion die and to the flow path of plastic material therethrough, each manifold communicating with one of said first and second conduit portions, to provide flow therethrough of material from said first and second conduit, said spacer and flow elements being of substantially greater dimension parallel to the elongated dimension of said extrusion orifice than in the dimension normal thereto to provide relatively thin layers of the synthetic plastic material flowing therebetween, each of said flow elements having at least one generally V-shaped aperture therein extending from one of said manifolds and expanding toward the other end of the flow element adjacent said extrusion orifice to provide for expanding flow therethrough of a stream of thermoplastic material from the conduits, at least two of said flow elements having overlying apertures extending from manifolds communicating with different conduits so as to provide superposed flow of thermoplastic material from both of said conduits at least in a portion of said stack, a spacer element separating said two flow elements from said manifolds for at least a portion of the distance to the end of said stack adjacent said extrusion orifice after which the superposed flowing materials may combine to produce a synthetic plastic sheet material having differentially colored layers, said spacer elements being relatively thin with respect to the thickness of said flow elements.

11. The extrusion assembly of claim 10 wherein said extrusion assembly includes a third conduit for supplying a third stream of fluid synthetic thermoplastic material at a third point in said chamber spaced from said extrusion orifice and from said first and second points and wherein said color distributing stack has a manifold communicating with said third conduit and wherein one of said flow elements has an aperture extending from a manifold communicating with said third conduit and an adjacent flow element has an aperture extending from a manifold communicating with one of said first and second conduits to provide superposed flow of thermoplastic material from said third conduit and said one of said first and second conduits in at least a portion of said stack with a spacer element separating said two flow elements for at least a portion of the distance to the end of the stack adjacent the extrusion die orifice after which the superposed flowing materials from the several conduits may combine to produce a synthetic plastic sheet material having layers with three differentiated colors.

12. The extrusion assembly of claim 10 wherein at least one of said flow elements has apertures extending from manifolds communicating with different conduits so as to provide adjacent flow of thermoplastic material from both of said conduits at least in a portion of said stack to provide differentially colored bands within the same layer of synthetic plastic sheet material produced therefrom.

13. The extrusion assembly of claim 10 wherein said color distributing stack has a plurality of adjacent flow elements with apertures therein communicating with the same manifold and relatively thin spacer elements disposed between each of said plurality of flow elements so as to provide a layer of the material from the conduit with which said manifold communicates which is a composite of the streams issuing from said plurality of flow elements.

14. The extrusion assembly of claim 10 wherein spacer elements in said color distributing stack have non-rectilinear edges adjacent said extrusion die orifice.

References Cited
UNITED STATES PATENTS

| | | | |
|---|---|---|---|
| 2,031,387 | 2/1936 | Schwarz | 18—8 |
| 2,808,617 | 10/1957 | Terracini et al. | |
| 2,985,556 | 5/1961 | Rowland. | |
| 3,192,562 | 7/1965 | Powell | 18—8 |
| 3,192,563 | 7/1965 | Crompton | 18—8 |
| 3,204,290 | 9/1965 | Crompton | 18—8 |
| 3,320,636 | 5/1967 | Corbett | 18—12 X |
| 3,321,804 | 5/1967 | Breidt et al. | 18—12 X |

WILLIAM J. STEPHENSON, *Primary Examiner.*

U.S. Cl. X.R.

18—8, 15